United States Patent
Andruet et al.

(10) Patent No.: US 8,867,323 B2
(45) Date of Patent: Oct. 21, 2014

(54) CONTROLLING HEAD-MEDIA SPACING USING A WRITE COIL

(71) Applicant: Seagate Technology LLC, Cupertino, CA (US)

(72) Inventors: Raul Horacio Andruet, Woodbury, MN (US); James Gary Wessel, Savage, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 13/687,282

(22) Filed: Nov. 28, 2012

(65) Prior Publication Data

US 2014/0146647 A1 May 29, 2014

(51) Int. Cl.
G11B 11/00 (2006.01)
G11B 17/32 (2006.01)

(52) U.S. Cl.
CPC ................................. *G11B 17/32* (2013.01)
USPC ................. 369/13.33; 369/13.13; 369/112.27

(58) Field of Classification Search
USPC .......... 369/13.17, 13.33, 13.24, 13.03, 13.35; 360/128, 123.17, 294.7, 59, 75, 234.3, 360/123.12, 123.1, 123.57, 125.31, 125.74
See application file for complete search history.

(56) References Cited

U.S. PATENT DOCUMENTS

| | | | |
|---|---|---|---|
| 6,975,472 B2 * | 12/2005 | Stover et al. | 360/59 |
| 7,119,990 B2 | 10/2006 | Bajorek et al. | |
| 7,190,543 B2 * | 3/2007 | Suk | 360/69 |
| 7,212,381 B2 * | 5/2007 | Mei et al. | 360/294.7 |
| 7,215,495 B1 * | 5/2007 | Che et al. | 360/31 |
| 7,283,327 B1 | 10/2007 | Liu et al. | |
| 7,375,912 B2 * | 5/2008 | Brannon et al. | 360/75 |
| 7,375,914 B1 * | 5/2008 | Dieron et al. | 360/75 |
| 7,457,072 B2 * | 11/2008 | Dieron et al. | 360/75 |
| 7,538,961 B2 * | 5/2009 | Lamberts et al. | 360/31 |
| 7,589,936 B1 | 9/2009 | McFadyen et al. | |
| 7,593,187 B2 | 9/2009 | Aoki | |
| 7,660,080 B1 * | 2/2010 | Liu et al. | 360/294.7 |
| 7,889,450 B2 | 2/2011 | Vikramaditya | |
| 2006/0028765 A1 | 2/2006 | Coffey et al. | |
| 2010/0103783 A1 * | 4/2010 | Gill et al. | 369/13.14 |
| 2011/0267715 A1 | 11/2011 | Heim et al. | |
| 2011/0299367 A1 | 12/2011 | Naniwa et al. | |
| 2012/0092789 A1 * | 4/2012 | Hsiao et al. | 360/59 |
| 2012/0099218 A1 * | 4/2012 | Kurita et al. | 360/59 |
| 2013/0293984 A1 * | 11/2013 | Poss et al. | 360/75 |

OTHER PUBLICATIONS

File History for U.S. Appl. No. 13/831,129.

* cited by examiner

*Primary Examiner* — Ali Neyzari

(74) *Attorney, Agent, or Firm* — Hollingsworth Davis, LLC

(57) ABSTRACT

While a heat-assisted, magnetic recording media is not being written to, heat applied from a write head to the recording media to facilitate writing to the recording media is removed. Power is applied to a write coil of the write head to control spacing between the write head and the recording media when the recording media is not being written to.

17 Claims, 4 Drawing Sheets

CONTROLLING HEAD-MEDIA SPACING USING A WRITE COIL

SUMMARY

The present disclosure is directed to controlling head-media spacing using a write coil. One embodiment described herein is directed to, while a heat-assisted, magnetic recording media is not being written to, removing heat applied from a write head to the recording media, the heat facilitating writing to the recording media. Power is applied to a write coil of the write head to control spacing between the write head and the recording media when the recording media is not being written. These and other features and aspects of to various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to magnetic recording devices used for data storage. Data storage systems may include one or more recording heads that read and write information to a magnetic recording medium. It is often desirable to have a relatively small distance or spacing between a recording head and its associated media. This distance or spacing is known as "flying height" or "head-media spacing." By reducing the head-media spacing, a recording head may better be able to both write and read data to and from a medium. Reducing the head-media spacing also allows for surveying of recording medium topography, such as for detecting asperities and other features of the recording medium surface.

Figure 1:
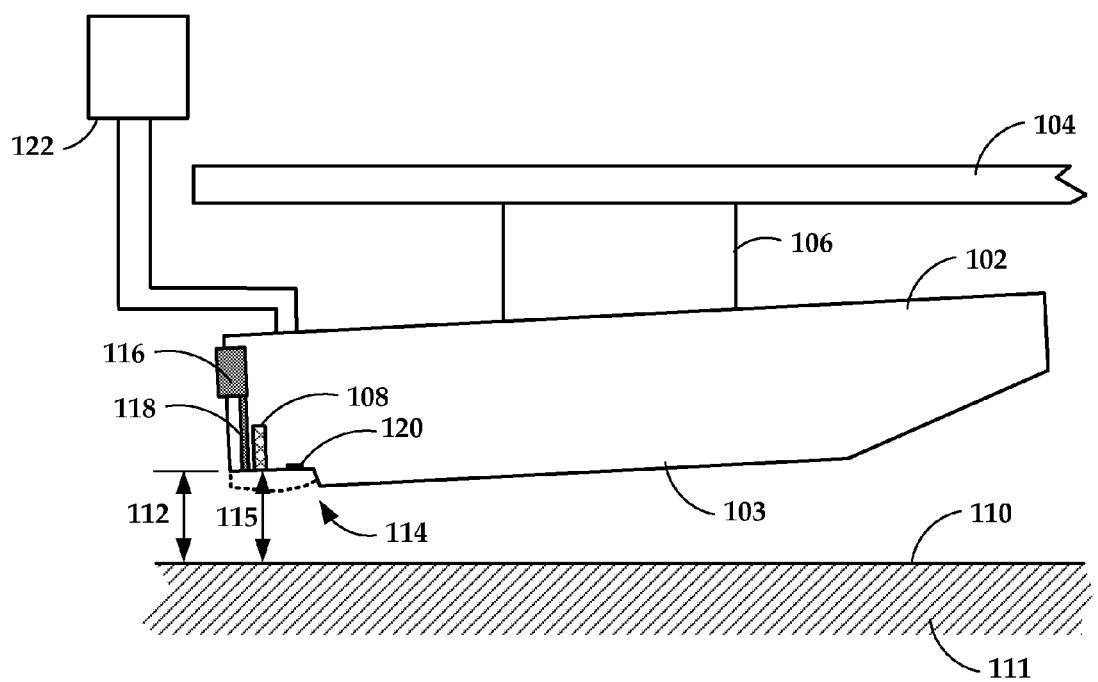
FIG. 1 is a block diagram of a hard drive slider and media arrangement according to an example embodiment.

In reference now to FIG. 1, a block diagram shows a side view of a magnetic sensor employed in a hard drive slider apparatus 102 according to an example embodiment. The slider 102 is coupled to an arm 104 by way of a suspension 106 that allows some relative motion between the slider 102 and arm 104. The slider 102 includes read/write transducers 108 at a trailing edge that are held proximate to a surface 110 of a magnetic recording medium, e.g., magnetic disk 111. When the slider 102 is located over surface 110 of the disk 111, a flying height 112 is maintained between the slider 102 and the surface 110 by a downward force of arm 104. This downward force is counterbalanced by an air cushion that exists between the media surface 110 and an air bearing surface 103 of the slider 102 when the disk 111 is rotating.

It is desirable to maintain a predetermined slider flying height 112 over a range of disk rotational speeds during both reading and writing operations to ensure consistent performance. A region 114 is a "close point" of the slider 102, which is generally understood to be the closest point of contact between the slider 102 and the magnetic recording medium 111. To account for both static and dynamic variations that may affect slider flying height 112, the slider 102 may be configured such that a region 114 of the slider 102 can be configurably adjusted during operation to affect a head-media spacing 115. This is shown in FIG. 1A by dotted line that represents a change in geometry of the region 114. In this example, the geometry change may be induced, in whole or in part, by an increase or decrease in temperature of the region 114.

The ability to shape and magnitude of the region due to temperature change may be due, e.g., to the region 114 being formed from a different material than other parts of the slider 102. In such a case, changes in temperature causes a deformation in this area 114 due to different thermal expansion properties of the respective materials. Thus, selective application of heat to the slider 102 can be used to finely adjust the effective head-media spacing 115 of the transducers 108, e.g., as measured between the transducers 108 and media surface 110.

To provide this type of control over head-media spacing 115, the slider 102 may include (or otherwise be thermally coupled to) a heating element (not shown). This heating element (e.g., a resistance heater) may be provided with selectable amounts of current to control the head-media spacing 115. Other elements of the slider 102 may also provide heat besides or in addition to the heating element. For example, a write coil of the read/write transducer 108 may generate sufficient heat to cause configurable deformation of region 114. This is sometimes referred to as "writer protrusion," and may need to be accounted for when the write coil is active, e.g., when writing is occurring. However, when there is no write activity, the write coil may be switched off, thereby requiring an adjustment to the heater to maintain the desired height at least for the write pole, although this may affect fly height of the read sensor as well.

The slider 102 may include a resistive temperature sensor 120 located at or proximate to region 114. This sensor 120 has a temperature coefficient of resistance (TCR) that enables high precision measurements of temperature (or temperature change) at the region 114, and so is sometimes referred to as a TCR sensor. The TCR sensor 120 is coupled to control circuitry 122. The control circuitry 122 communicates with the sensor 120, as well as other electrical components of the slider 102. Two or more TCR sensors 120 may be employed, e.g., disposed in physically separate locations from each other. Multiple sensors 120 be wired separately from each other, or together (e.g., in series or parallel) to reduce the number of connections needed for the slider 102.

In this particular example, the disk 111 is a heat-assisted magnetic recording (HAMR) medium, also sometimes referred to as a thermal-assisted magnetic medium (TAMR). A HAMR medium 111 is able to overcome superparamagnetic effects that limit the areal data density of typical magnetic media. In order to record on this media, a small portion of the medium 111 is locally heated while being written to by the write portion of transducer 108. An energy source such as a laser 116 may provide the energy to create these hot spots, and optical components. The laser 116 may be built into or attached to the slider 102, which includes an optical pathway 118 (e.g., waveguide) configured direct and focus this energy onto a hotspot of the medium 111. While the present disclosure describes HAMR disk drives, similar approaches may be used in other types of data recording, such as in magneto-optical (MO) systems.

The laser 116 of the HAMR slider 102 creates a hotspot on the media surface 110, which locally reduces magnetic coercivity such that the write pole's magnetic field can change the magnetic orientation within the hotspot. If the magnetic field extends significantly outside the hotspot region, the unheated regions will not be magnetically changed due to the higher coercivity of those unheated regions. Thus, the HAMR slider 102 can write bits that are no larger than the hotspot, even if the magnetic field extends over a much larger area.

The high coercivity of the unheated HAMR medium 111 means that the write coil of transducer 108 can operate without affecting the medium 111 as long as the laser 116 (or other media-heating source) is disengaged from the medium 111 (e.g., turned off, redirected) causing the heat to be removed from the surface 110. As noted above, due to heat generated by the write coils, this allows the writer coil to be used to adjust a head-media spacing 115 without a separate heater. While a heater may still be included for other purposes (e.g., separately adjusting effective fly height another part of transducer 108), the slider 102 need not include a heater dedicated to adjusting fly height of one of the read or write portion of transducer 108. This can result in minimizing the number of electrical connections required for the slider 102, which can be at a premium in a HAMR slider 102 due to the inclusion of additional components such as laser 116.

Figure 2:
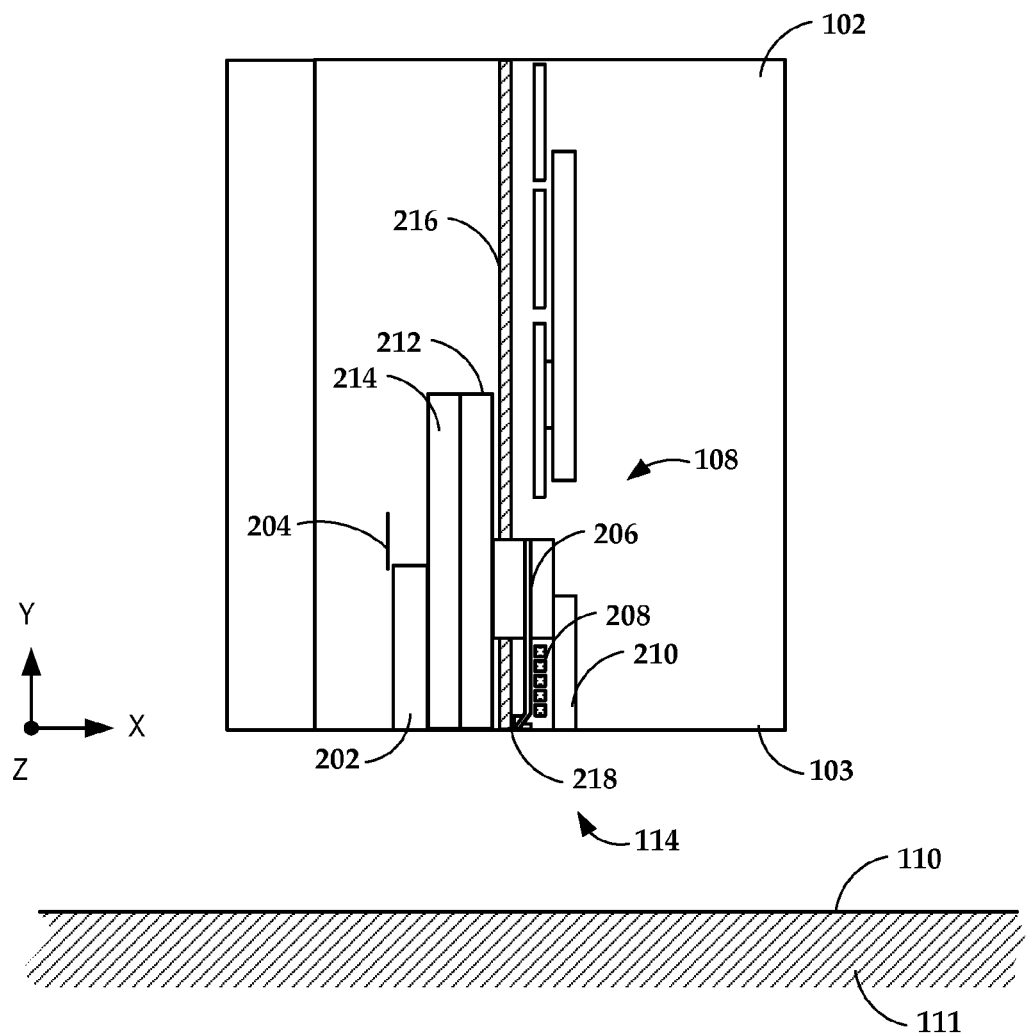
FIG. 2 is a cross-sectional view of a write head according to an example embodiment.

In reference now to FIG. 2, a cross-sectional diagram shows components of a read/write transducer 108 according to an example embodiment. This diagram shows a portion of slider 102 near the close-point region 114. In this view, the x-direction is down-track relative to the media, and the z-direction (normal to the plane of the page) is the cross-track direction. A read sensor 202 is located near the ABS 103. The read sensor may include a magnetoresistive stack and shielding. A reader heater 204 may be implemented to adjust local spacing between the read sensor 202 and the media surface 110.

A write pole 206 may include a ferromagnetic structure that extends to the ABS 103. A write coil 208 is energized to generate a magnetic field within the write pole 206 that extends to the media surface 110. The slider 102 may be configured for perpendicular recording, wherein the magnetic orientation is perpendicular (oriented along the y-direction in this view) to the media surface 110. Accordingly, the slider may include one or more return poles 210, 212 that facilitate, along with a particular arrangement of layers in the medium 111, perpendicular orientation of the magnetic fields of the recorded data. A spacer 214 may be disposed between the read and write portions of the slider 102.

In order to write to the HAMR medium 111, the slider includes a waveguide 216 that extends towards the ABS 103. The waveguide 216 delivers light to a near-field transducer (NFT) 218 that is located at the ABS 103 proximate a tip of the write pole 206. The NFT 218 facilitates directing a beam of electromagnetic energy to the media surface 110 during write operations. The energy creates a small hotspot on the media surface 110 with lowered magnetic coercivity, enabling a magnetic field generated from the write pole 206 to affect magnetic orientation within the hotspot.

In some configurations, the spacer 214 (or some other region proximate the write pole 206 and/or return poles 210, 212) may also include a heater to adjust the head-to-media spacing of the write pole 206 independently from that of the read sensor 202. However, in this example, the slider does not include a separate heater. Instead, the write coil 208 can be activated to provide the heat that might normally be provided by that separate heater. Any magnetic fields generated by this activation of the coil 208 will not change data on the medium 111 so long as the light source is not activated to heat the media surface 110.

The illustrated example shows a reader heater 204 used with write coil 208 to independently control head-to-media clearances of read and/or write portions of transducer. In one example, the reader heater 204 controls head-media spacing of the read sensor 202, and the write coil 208, either alone or in combination with the reader heater 204, controls head-media spacing of the write pole 206. In another example, a different heater (e.g., one located proximate write portions of transducer 108) may be used to control head-media spacing of the write pole 206, and the write coil 208 (either alone or together with the different heater) is used to adjust head-media spacing of the read sensor 202, assuming the activation of the write coil 208 causes little or no interference with the read sensor 202.

Figure 3:
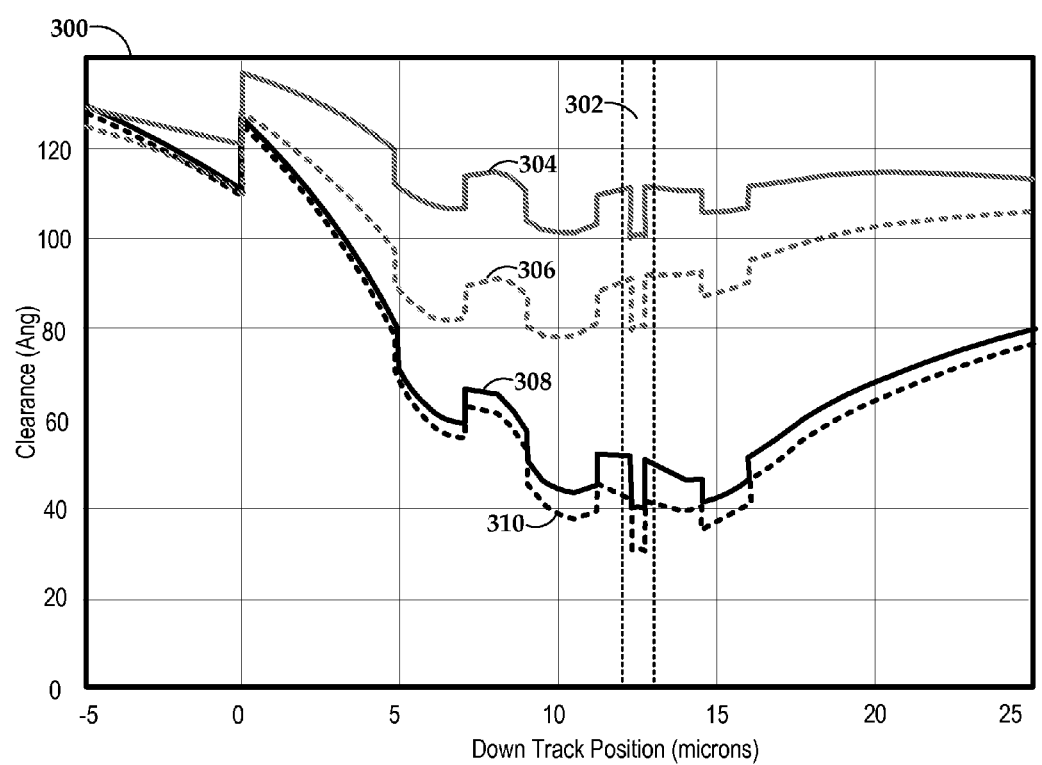
FIG. 3 is a graph illustrating write coil induced protrusion according to an example embodiment.

In reference now to FIG. 3, a graph 300 illustrates an example of ABS protrusions of a HAMR slider according to an example embodiment. In this graph 300, profiles of the ABS are represented as spacing/clearance between the ABS and media along the vertical axis, and downtrack position along the horizontal axis. Downtrack region 302 represents a close point (e.g., near the read or write transducer) of the ABS. Trace 304 represents the profile at an ambient temperature where no power is applied to either a heater or write coil. Trace 306 is the profile when heater alone is powered; trace 308 represents the profile when heater and write coil are energized; and trace 310 represents the profile when heater, write coil, and laser are all energized.

As the difference between traces 306 and 308 illustrate, the write coil alone may be able to generate enough heat to cause sufficient protrusion. Also, the write coil may be used in combination with one or more heaters operating together (instead of a dual heaters operating separately) to achieve desired clearances of both the write and read portions of a magnetic head at different times and/or states of the slider. For example, the write coil current can be set to a value that maximizes performance (at a constant head-media spacing) then, in parallel, use a dedicated heater to bring clearance to the desired value. This may be useful during write operations, where write coil activation for writing will cause some predictable amount of protrusion, and the dedicated heater could fine tune the clearances.

Various features of a read/write head may be designed in such a way as to fully take advantage of the writer protrusion as a mechanism for controlling head-media spacing. For example, a resistance of a write coil could be increased to induce higher temperatures for purposes of influencing head-media spacing. The write coil and/or surrounding areas could be designed with a higher coefficient of thermal expansion to increase protrusion. In another example, features designed to cool the write coil could be designed in such a way as to decrease cooling at the coil and proximate areas, e.g., using materials of lower thermal conductivity.

Figure 4:
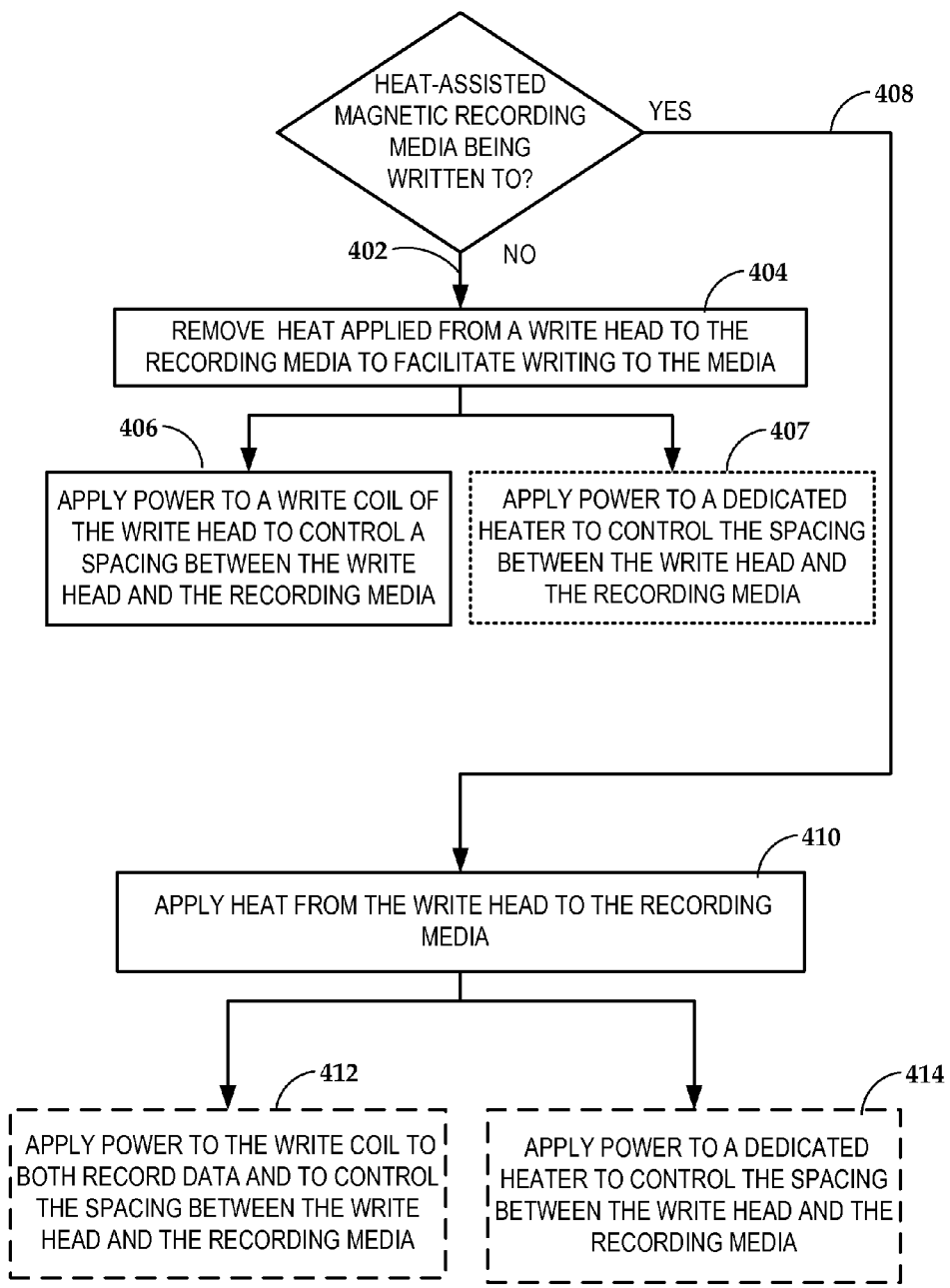
FIG. 4 is a flowchart illustrating a procedure according to an example embodiment.

In reference now to FIG. 4, a flowchart illustrates a procedure according to an example embodiment. In this procedure, a first path 402 is taken if a heat-assisted magnetic recording media is not being written to. In such a case, heat from a write head to the recording media is removed 404. This may involve turning off or disengaging a device (e.g., laser, optical pathway) that provides the heat. Power is applied 406 to write coil of the write head to control a spacing between the write head and the recording media when the media is not being written to. This may include spacing between a read and/or write element of the write head. Optionally, power may be applied 407 to a dedicated heater to control the spacing in parallel with the application 406 of power to the write coil.

Path 408 represents head-to-disk clearance operations that occur when the recording media is being written to, where at least a source of heat (e.g., laser light) is applied to the recording media. Heat is applied 410 from the write head to the recording media 410. One or both of operations 412 and 414 may be performed to adjust a clearance (e.g., clearance between media and read head and/or write pole) while the media is being written to. Operation 412 involves applying power to the write coil to both record data and to control spacing between the write head and the media. Operation 414 involves applying power to a dedicated heater to control the spacing between the write head and the media. This may be the same dedicated heater used at block 407.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   removing, while a heat-assisted, magnetic recording media is not being written to, heat applied from a write head to the recording media via a near-field transducer, the heat facilitating writing to the recording media; and
   applying power to a write coil of the write head to control a spacing between the write head and the recording media when the recording media is not being written to.

2. The method of claim 1, wherein applying the power to the write coil causes a heat-induced protrusion of the write head that varies the spacing between the write head and the recording media.

3. The method of claim 1, wherein the application of the power to the write coil is employed in place of a heater dedicated to adjusting the spacing for a transducer of the write head.

4. The method of claim 1, further comprising:
   applying the heat to the recording media via the write head when the recording media is being written to; and
   applying the power to the write coil to both record data and to control the spacing between the write head and the recording media when the recording media is being written to.

5. The method of claim 1, further comprising:
   applying the heat to the recording media via the write head when the recording media is being written to; and
   applying power to a dedicated heater to control spacing between the write head and the recording media when the recording media is being written to.

6. The method of claim 1, wherein the application of power to the write coil when the recording media is not being written to applies a magnetic field to the recording media, and wherein the magnetic field does not write data to the recording media due to a removal of the heat.

7. A write head, comprising:
   a device configured to apply heat to a heat-assisted magnetic recording media via a near-field transducer to facilitate writing to the recording media;
   a write coil configured to apply a magnetic field to the magnetic media in response to application of power to the write coil, wherein the write coil is configured to control, at least when the heat is removed from the recording media, a spacing between the write head and the magnetic media in response to the application of power to the write coil.

8. The write head of claim 7, further comprising an optical device configured to apply energy to the near-field transducer.

9. The write head of claim 7, wherein the application of power to the write coil causes a heat-induced protrusion of the write head that varies the spacing between the write head and the recording media.

10. The write head of claim 7, wherein the application of the power to the write coil is employed in place of a heater dedicated to controller the spacing for a transducer of the write head.

11. The write head of claim 7, wherein the write coil is further configured to both record data to the magnetic media and to control the spacing between the write head and the recording media during writing to the recording media.

12. The write head of claim 7, wherein the magnetic field does not write data to the recording media when the heat is removed from the recording media.

13. An apparatus, comprising:
   a write head comprising a write coil;
   an optical device configured to apply heat to a heat-assisted magnetic recording media via the write head during writing; and
   a controller coupled to the write head and the device, the controller configured to:
   remove the heat from the recording media when the recording media is not being written to; and
   apply power to the write coil, wherein the write coil is configured to control, at least when the heat is removed from the recording media, a spacing between the write head and the magnetic media in response to the application of power to the write coil.

14. The apparatus of claim 13, wherein the application of power to the write coil causes a heat-induced protrusion of the write head that varies the spacing between the write head and the recording media.

15. The apparatus of claim 13, wherein the application of the power to the write coil is employed in place of a heater dedicated to control the spacing of a transducer of the write head.

16. The apparatus of claim 13, wherein the write head comprises a dedicated heater, and wherein the controller is further configured to:
   apply the heat to the recording media via the write head to when the recording media is being written to; and
   apply power to the dedicated heater to control the spacing between the write head and the recording media when the recording media is being written to.

17. The apparatus of claim 13, wherein the application of the power to the write coil when the recording media is not being written to applies a magnetic field to the magnetic media, wherein the magnetic field does not write data to the recording media when the heat is removed.

* * * * *